July 29, 1969   J. MOORE ET AL   3,458,070
HANDLING APPARATUS

Filed Oct. 10, 1967   3 Sheets-Sheet 3

United States Patent Office 3,458,070
Patented July 29, 1969

3,458,070
HANDLING APPARATUS
John Moore, Penistone, and John Thomas Henry Wild, Sheffield, England, assignors to Davy and United Engineering Company Limited, Sheffield, England
Filed Oct. 10, 1967, Ser. No. 674,272
Claims priority, application Great Britain, Oct. 13, 1966, 45,891/66
Int. Cl. B65g 47/34
U.S. Cl. 214—301                               12 Claims

ABSTRACT OF THE DISCLOSURE

Article handling apparatus for receiving and handling an article such as a moulding which is travelling along a prescribed path from a moulding press comprises a carrying head having an opening therein with two or more slide plates slidable between an inoperative position in which the article travelling along the path passes through the plates and into the opening in the head and an operative position in which the article is supported in the head on the plates and the head is provided with means for clamping the article in the opening when the plates are in the operative position. It is also convenient for the head to be rotatable so that after the article has been clamped therein the head can be rotated to invert the opening and consequently the article therein and simultaneously displace the opening away from the prescribed path so that the article can be removed from the head at a position away from the prescribed path which it takes as it enters the head.

---

This invention relates to article handling apparatus particularly, but not exclusively, for use with a moulding press such as that described in U.S. Patent No. 3,340,582.

According to the present invention article handling apparatus for receiving and handling an article travelling along a prescribed path comprises a carrying head including two or more slide plates slidable between an inoperative position in which the article travelling along the path can pass therebetween into an opening in the head and an operative position in which the article is supported on the plates and means for clamping the article in the opening in the head when the plates are in the operative position.

Conveniently the clamping means comprises a hydraulic or pneumatic piston/cylinder arrangement mounted on the head and the piston or a part displaceable therewith is displaceable into engagement with the article in the opening.

When the article is travelling upwardly along a prescribed path and a piston is used to discharge the article along the path it is convenient for the slide plates to have a configuration which enables them to closely surround the piston when the plates are in the operative position.

When the article handling apparatus is used in combination with a moulding press the article to be handled is a moulding pressed in a mould on a moulding plate and at the ejection station of the press the mould plate with the moulded article carried thereon is lifted vertically by a split sleeve acting against the bottom of the mould plate. The moulded article and the mould plate is then received into the carrying head. It is then convenient for the head to be rotatable to invert the opening therein and simultaneously displace the opening away from the prescribed path along which the moulded article enters the head. When the head is in the non-inverted position a handling plate may be clamped between the article and the piston of the piston/cylinder arrangement or the part displaceable with the piston so that in the inverted position the article is supported on the handling plate. The head may be provided with rollers so that the article on the handling plate and after it has been removed from the mould plate can be discharged from the head.

If the mould plate is of a magnetic material it is convenient for the slide plates to carry an electromagnet which is energisable to retain the mould plate in the opening in the head when the article on the handling plate is discharged from the head. Each slide plate may carry an electromagnet so arranged that when the plates are in their operative position the magnets form a closed annulus.

In order that the invention may be more readily understood it will be now described, by way of example only, with reference to its use in combination with a grinding wheel press, reference being made to the drawings filed with the provisional specification in which.

Figure 1:
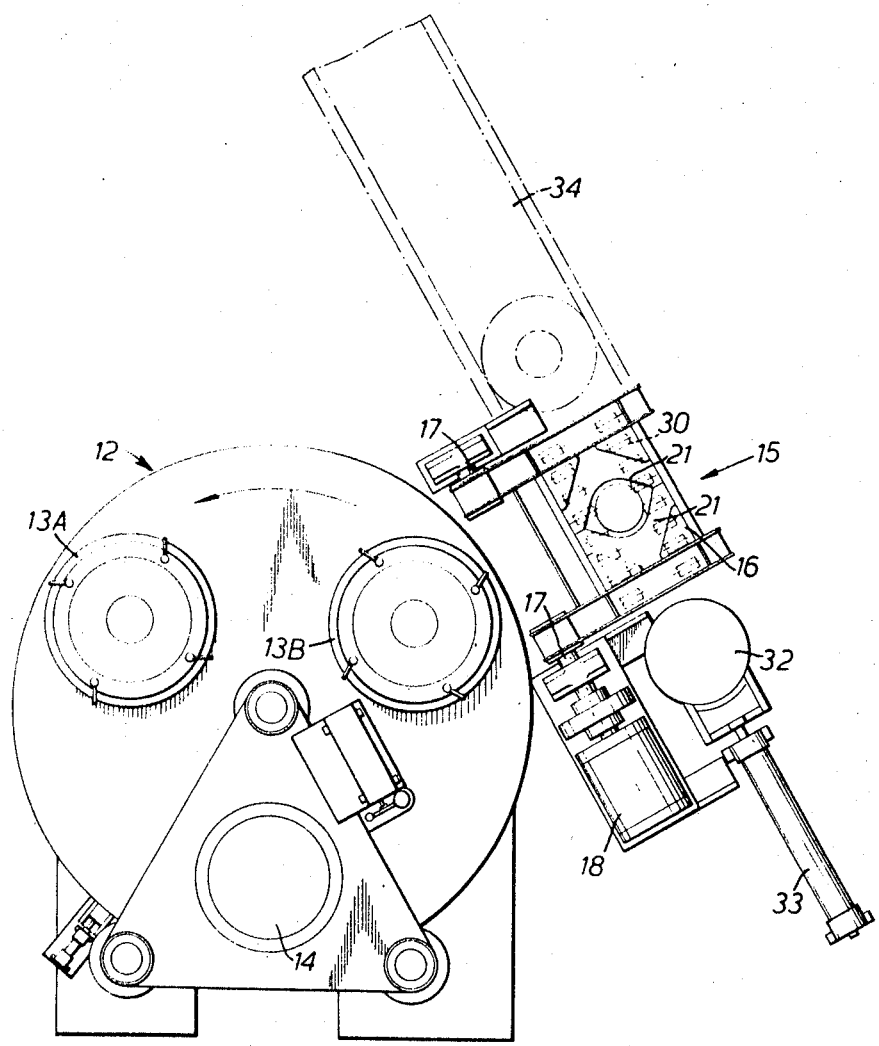
FIGURE 1 is a plan view of the press and turn-over gear.
Figure 4:
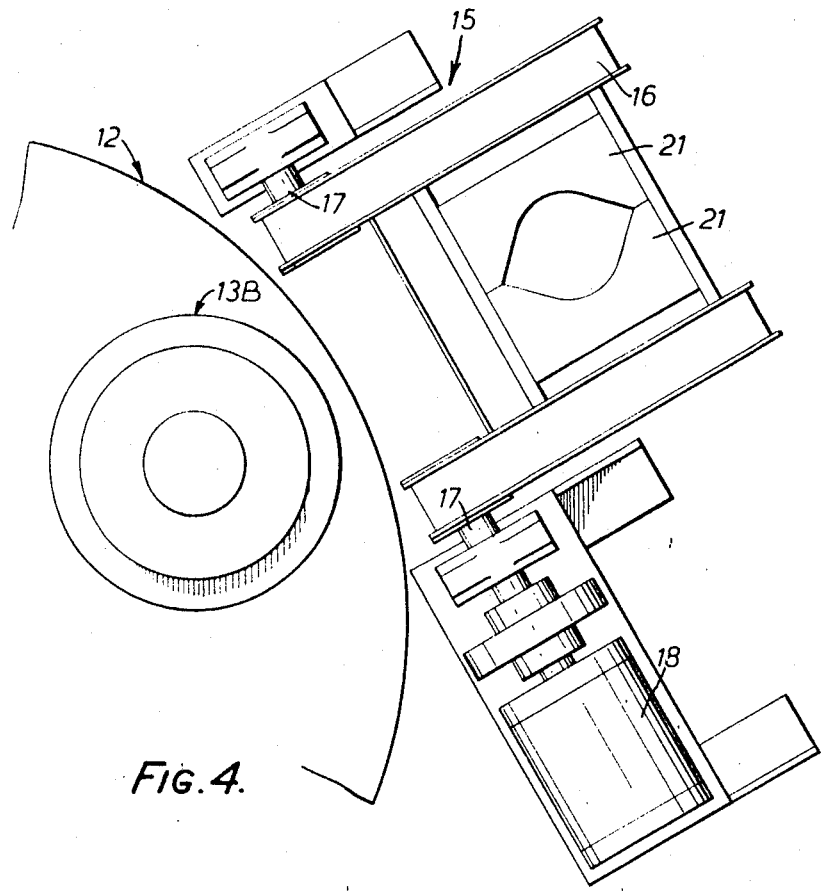
FIGURE 4 is a plan view corresponding to FIGURE 3, and FIGURES 5 and 6 show the sliding plates of the turn-over gear in the open and closed positions respectively.

In FIGURES 1 and 4, the press is shown at 12 and consists of three moulds 13, of which two only are visible in FIGURE 1. The three moulds are movable together to bring each in succession to a loading position 13A, a moulding position 14 and a discharge position 13B. The handling apparatus is shown generally at 15.

Figure 2:
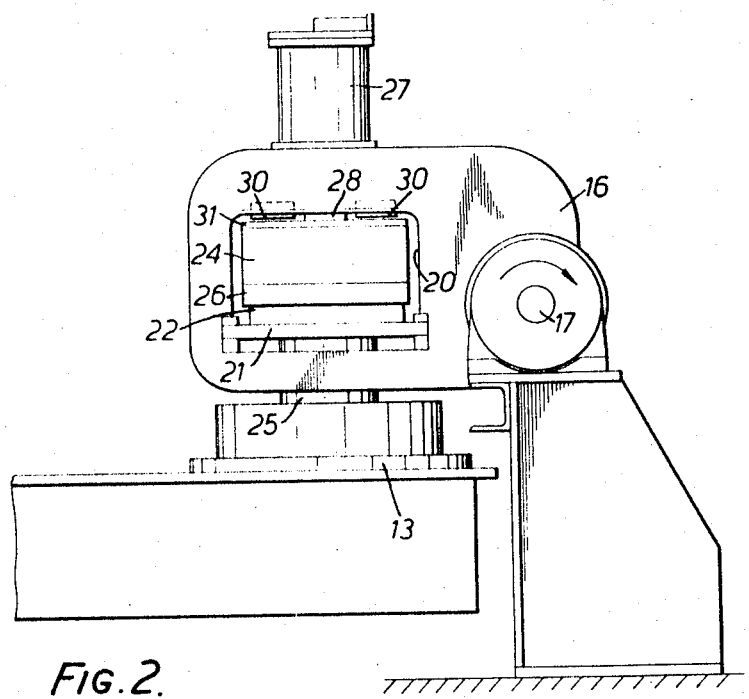
FIGURES 2 and 3 are side views of the turn-over gear in the loading and unloading positions, respectively.
Figure 3:
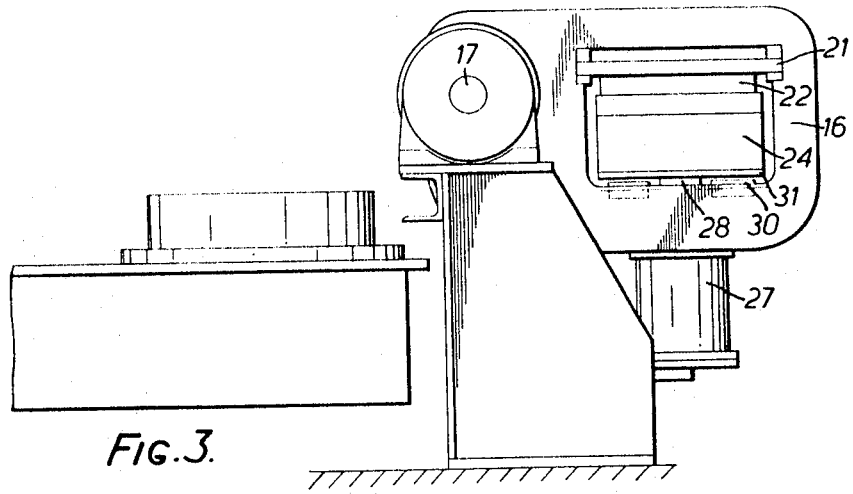

The handling apparatus consists of a carrying head 16, which is carried on horizontal stub shafts 17 and which can be rotated between the two positions of FIGURES 2 and 3 by an electric motor or other actuator 18. The head 16 has a cylindrical opening 20, which is closed at the bottom, when in the position of FIGURE 2, by a pair of horizontal slide plats 21, each carrying a half ring electromagnet 22 shown in more detail in FIGURE 6. The sliding plates 21 can be driven towards and away from each other by pneumatic cylinders 23. When the plates 21 are in the open inoperative position of FIGURE 5, they permit the passage therebetween of a moulded grinding wheel 24, while, in the closed operative position of FIGURE 6, they can support the grinding wheel 24 but still leave an opening free for the split sleeve 25 which causes ejection of the grinding wheel 24 and mould plate 26 from the mould 13.

At the top of head 16, as seen in FIGURE 2, there is a vertical pneumatic cylinder 27, the piston 28 of which carries a further electromagnet. Also, recessed in the top of the head 16 are a set of rollers 30, to facilitate unloading of the grinding wheel from the turn-over gear.

Figure 5:
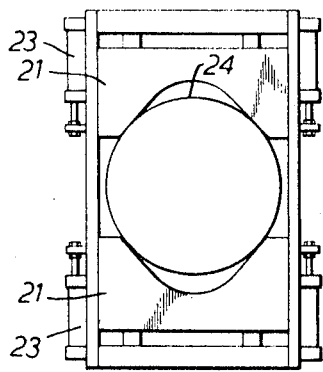
Figure 6:
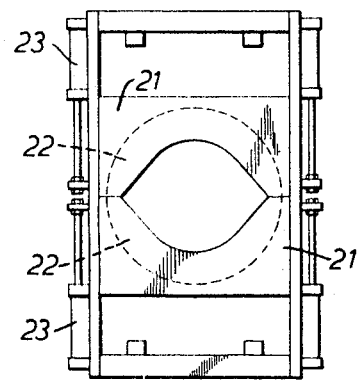

In operation, when the mould assembly is operated to bring a mould containing a moulded grinding wheel into the discharge position 13B, the turn-over head 16 is in the loading position shown in FIGURE 2, with a handling plate 31 held gainst the lower end of the piston 28 by the electromagnet; the sliding plates 21 are in the open position of FIGURE 5. The discharge gear of the mould is operated and the split sleeve 25 rises and carries the mould plate 26 and grinding wheel 24 along a prescribed path upwardly between the plates 21 and into the opening 20. When this has been effected the pneumatic cylinders 23 are actuated to drive plates 21 towards one another and into the closed position of FIGURE 6. Next split sleeve 25 is withdrawn downwardly, the mould plate 26 being brought to rest on the electromagnet ring 22 of the plates 21.

The pneumatic cylinder 27 is now actuated to clamp in the head 16, the assembly of mould plate 26, grinding wheel 24 and handling plate 31. When so clamped, the head 16 is rotated above the shafts 17 into the unloading position of FIGURE 3 which is away from the prescribed path and in which the grinding wheel is inverted.

In the unloading position, the eletromagnet 22 on the slide plates 21 are energised and then the pneumatic cylinder is de-energised, causing the handling plate 31 and grinding wheel 24 to be lowered on to the rollers 30, the mould plate 22 being retained by the electromagnets. A further handling plate at a handling plate station 32 (FIGURE 1) is forced horizontally by a pusher cylinder 33 into the head 16 to displace onto the discharge table 34, the handling plate 31 previously within the head; naturally, the grinding wheel 24 is discharged at the same time.

There only remains to return the moulding plate 26 to the mould 13. To do this, the electromagnet on the piston 28 is energised and the handling plate clamped against the mould plate 26 by operation of cylinder 27. The head 16 is turned back to the position of FIGURE 2 and, when that position has been achieved, the split sleeve 25 of the mould 13 is raised through the opening in the closed plates 21 and lifts the moulding plate 26 off plates 21, the electromagnets 22 having been previously de-energised. The pneumatic cylinders 23 are operated to withdraw the sliding plates 21 into their open positions of FIGURE 5 and the split sleeves 25 are retracted to lower the moulding plate through the plates 21 to the bottom of the mould 13, ready for the next moulding operation. The mould may then be indexed into the next position, the new handling plate 31 for the next grinding wheel to be discharged being already in position and held by the electromagnet of piston 28.

As will be appreciated, the operation of the turn-over gear may be made automatic, or at least semi-automatic. There is no manual handling of either the moulding plates 26 or the handling plates 31.

Although in the embodiment described, the devices 23, 27 and 33 are pneumatically operated they could be hydraulically operated.

We claim:
1. Article handling apparatus for receiving and handling an article traveling along a prescribed path comprising a carrying head defining a chamber therein, at least two slide plates displaceable between an inoperative position in which an article traveling along the path can pass therebetween into the chamber in the head and an operative position in which an article cannot pass therebetween, means for clamping the article in the chamber against said plates when in the operative position and means for rotating the head to invert the chamber therein and simultaneously displace the chamber away from the prescribed path.

2. Article handling apparatus as claimed in claim 1 in which the clamping means comprises a fluid actuatable piston/cylinder arrangement mounted on the head with the piston displaceable into clamping engagement with the article in the opening.

3. Article handling apparatus as claimed in claim 1 in which the slide plates are displaceable between their operative and inoperative positions by fluid actuating means.

4. Article handling apparatus as claimed in claim 1 in which the article is discharged upwardly along the prescribed path by means of a piston and the slide plates have a configuration which enables them to closely surround the piston when the plates are in the operative position.

5. Article handling apparatus for receiving and handling an article travelling along a prescribed path comprising a carrying head defining an opening therein, at least two slide plates slidable between an inoperative position in which the article travelling along the path can pass therebetween into the opening in the head and an operative position in which the article is supported on the plates, fluid actuating means for displacing the slide plates, fluid actuatable piston and cylinder arrangement mounted on the head with the piston displaceable into clamping engagement with the article in the opening, and means for rotating the head to invert the opening therein and simultaneously displace the opening away from the predescribed path.

6. Article handling apparatus as claimed in claim 5 in which in the non-inverted position of the head, a handling plate is clamped between the article and the piston of the piston and cylinder arrangement, so that in the inverted position of the head the article is supported on the handling plate.

7. Article handling apparatus as claimed in claim 5 in which rollers are provided in the head so that the inverted article supported on its handling plate may be discharged from the head on the rollers when the clamping force is removed.

8. Article handling apparatus as claimed in claim 7 in which the handling plate with the article thereon is discharged from the head by a further handling plate pushed into the opening in the head.

9. Article handling apparatus as claimed in claim 8 in which a fluid operated actuating device is provided to push the further handling plate horizontally into the opening in the head.

10. Article handling apparatus as claimed in claim 5 in which the article is in the form of a moulding and enters the head supported on a mould plate of magnetic material, an electromagnet is supported on the slide plates and the electromagnet when energised retains the mould plate in the opening when the article is discharged from the head.

11. Article handling apparatus as claimed in claim 10 in which each slide plate carries an electromagnet arranged so that when the plates are in their operative position the electromagnets form a closed annulus.

12. Article handling apparatus as claimed in claim 5 in combination with a moulding press.

References Cited
UNITED STATES PATENTS

| | | |
|---|---|---|
| 1,744,128 | 1/1930 | Lorenz. |
| 2,651,087 | 9/1953 | Fellows. |

FOREIGN PATENTS

| | | |
|---|---|---|
| 41,017 | 5/1965 | Germany. |

GERALD M. FORLENZA, Primary Examiner

F. E. WERNER, Assistant Examiner

U.S. Cl. X.R.

214—1, 314